United States Patent [19]
Makinen

[11] Patent Number: 5,598,125
[45] Date of Patent: Jan. 28, 1997

[54] METHOD FOR DEMODULATING A DIGITALLY MODULATED SIGNAL AND A DEMODULATOR

[75] Inventor: Jarmo Makinen, Espoo, Finland

[73] Assignee: Nokia Telecommunications OY, Espoo, Finland

[21] Appl. No.: 557,196

[22] PCT Filed: Jun. 2, 1994

[86] PCT No.: PCT/FI94/00230

§ 371 Date: Dec. 4, 1995

§ 102(e) Date: Dec. 4, 1995

[87] PCT Pub. No.: WO94/28662

PCT Pub. Date: Dec. 8, 1994

[30] Foreign Application Priority Data

Jun. 2, 1993 [FI] Finland ..................... 932519

[51] Int. Cl.⁶ ............... H03D 3/00; H04L 27/14; H04L 27/22
[52] U.S. Cl. ............ 329/304; 329/300; 329/302; 329/306; 375/324; 375/328; 375/329; 375/334
[58] Field of Search ................. 329/300–310; 375/324, 325, 327, 328, 329, 334

[56] References Cited

U.S. PATENT DOCUMENTS

| | | | |
|---|---|---|---|
| 4,873,683 | 10/1989 | Borth et al. | 375/325 X |
| 5,081,650 | 1/1992 | Hasegawa et al. | 375/324 |
| 5,128,966 | 7/1992 | Bang | 329/306 X |
| 5,159,710 | 10/1992 | Cusdin | 455/304 |
| 5,398,002 | 3/1995 | Bang | 329/308 X |

FOREIGN PATENT DOCUMENTS 0333266  3/1989  European Pat. Off. .
91/02421  2/1991  WIPO .

*Primary Examiner*—David Mis
*Attorney, Agent, or Firm*—Cushman Darby & Cushman IP Group of Pillsbury Madison & Sutro LLP

[57] ABSTRACT

The invention relates to a method for demodulating a digitally modulated signal and to a demodulator. According to the method, a signal (S) to be received is mixed essentially to quadrature related I and Q baseband signals. For improving the interference tolerance of the demodulator, for instance, differences ($\alpha$) between directional angles ($\beta$, $\gamma$) of sequential shifts of a signal point on I/Q plane are measured from the baseband signals and said difference is utilized for decision-making concerning a received symbol.

13 Claims, 4 Drawing Sheets

5,598,125

METHOD FOR DEMODULATING A DIGITALLY MODULATED SIGNAL AND A DEMODULATOR

This application claims benefit of international application PCT/FI94/00230 filed Jun. 2, 1994.

The invention relates to a method for a quadrature demodulation of a digitally modulated signal. In the method a signal to be received is mixed essentially to quadrature related I and Q baseband signals. The invention also relates to a demodulator comprising mixing means for mixing a signal to be received into I and Q signals, which are essentially in quadrature with each other.

The method of the invention suits best for constant amplitude modulations, e.g. for FSK (Frequency Shift Keying) signals and MSK (Minimum Shift Keying) signals, but the principle may also be applied to non-constant amplitude modulations.

Figure 1:
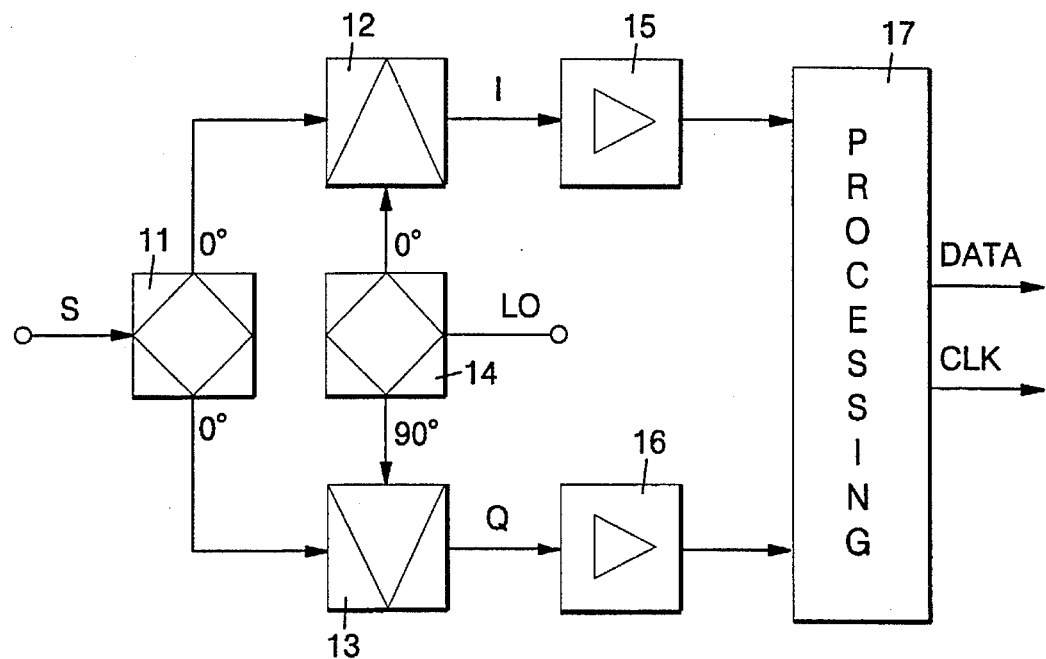

A quadrature demodulator is typically used e.g. in connection with QAM (Quadrature Amplitude Modulation), PSK (Phase Shift Keying) and CPM (Continuous Phase Modulation). FIG. 1 shows a typical demodulator using quadrature demodulation for demodulating a digitally modulated signal. The input of a receiver comprises a power splitter 11 splitting an RF or intermediate frequency signal S to be received in-phase to the signal input of a mixer 12 of branch I and to the signal input of a mixer 13 of branch Q. Via a second power splitter 14, a local oscillator signal LO is applied in-phase to the local oscillator input of the mixer 12 of branch I and, phase-shifted by 90 degrees, to the local oscillator input of the mixer 13 of branch Q. The base-band signals I and Q obtained from the outputs of the mixers are each applied via a dedicated baseband amplifier 15 and 16, respectively, to a processing unit 17, in which sampling and decision-making are performed. The baseband amplifiers possibly also comprise low-pass filtering and equalizers.

The contents of the processing unit 17 depends on which modulation method is used each time. For example, in the case of a QPSK (Quadrature Phase Shift Keying) signal, the processing unit comprises decision-making comparators (comparing whether the signal is positive or negative, i.e. whether a logic one or a logic zero has been received) as well as clock and carrier wave regenerating circuits. The clock regenerating circuits set a correct sampling instance and the carrier wave regenerating circuits keep the local oscillator signal LO phase-locked with respect to an incoming signal.

When using quadrature demodulation according to the above, various problems occur in practice, which will be described in the following.

(A) A first group of problems consists of phase noise coming from local oscillators and of phase hits of the local oscillator signal LO, the hits being caused by mechanical and electrical reasons and causing rotations of a constellation diagram as well as jitter.

(B) A second group of problems consists of an offset (of voltage level) occurring in the output voltage of the mixers (12 and 13) and in the subsequent amplifiers (15 and 16) and leading to a displacement of decision-making limits.

(C) In case the previous drawback has been corrected by a.c. coupling the baseband amplifiers, signal distortion is generated, because the lowest frequencies of the signal are cut off. This appears as distortion especially in long trains of ones and zeroes.

(D) A fourth group of problems consists of the mechanical sensitivity (microphonism) of the quadrature mixer (12 and 13), causing interference voltages in baseband signals. These are especially disadvantageous at so-called direct reception (incoming signal is an RF signal), as the amplification of the baseband amplifiers should be high.

(E) A fifth group of problems relates particularly to direct reception, where a wide frequency band comes to the mixers (12 and 13). Thereby, even signals located far from the reception frequency and having varying amplitudes cause rectification in the mixers. This appears in a baseband signal as an interference voltage corresponding to amplitude changes. Alternatively, a mixing together of two interference signals having frequencies close to each other may cause intereferences in a baseband signal.

All phenomena mentioned above cause errors in the reception.

Attempts have been made earlier to solve the above-mentioned problems by following means.

(A) The influence of interferences relating to a signal phase has been attenuated in some cases by using differential detection. This has been implemented in such a way that the phase of a reference carrier wave generated by a separate oscillator and phase-locked (at narrow-band) to the signal is not used as the phase reference of the detection, but the phase of a symbol (symbols) preceding the moment of decision-making is used instead. The influence of low frequency phase changes decreases then considerably, but there is a slight loss of sensitivity at the reception.

(B) and (C) The influence of baseband offset voltages can be corrected by a.c. coupling the baseband amplifiers. This causes distortion in a signal, and therefore, the low limit frequency of the amplifiers shall be made very low or a feedback shall be generated at the decision-making stage, which feedback tends to regenerate the low frequency signal components lost in the amplifiers. This feedback loop must be relatively slow in order not to couple back too much noise. These feedback loops are capable of eliminating only relatively slow effects from the baseband frequency.

(D) As to low frequencies, the microphonism can be reduced as in paragraphs (B) and (C), but the spectrum of an interference caused by the microphonism of the mixers usually reaches frequencies so high that the above means are not sufficient for eliminating this effect entirely.

(E) Depending on the rate of amplitude changes in non-constant amplitude interference signals and on the frequency difference between mutually mixing interference signals, an interference component is provided in the baseband frequency, for the elimination of which no method is known at present.

The object of the present invention is to reduce the problems described above and to provide a novel differential demodulation method and a demodulator. This is achieved by means of the method according to the invention, which is characterized in that from the baseband signals are measured differences between directional angles of sequential shifts of a signal point on I/Q plane and said difference is utilized for decision-making concerning a received symbol. The demodulator according to the invention again is characterized in that it comprises means for measuring differences between directional angles of sequential signal point shifts occurring on I/Q plane.

The idea of the invention is to use differential detection by measuring differences between directional angles of signal point (constellation point) shifts occurred on an I/Q plane and to decide the received symbols either on the basis of these differences only or on the basis of these differences and the lengths of the shifts occurred on the I/Q plane (each time using decision-making limits dependent on the modulation method used).

Contrary to the previous solutions, the intention of the differential detection according to the invention is thus not to measure angles of constellation points with respect to origin, from which a difference could then be calculated. The intention according to the invention is instead to measure the angle between the directions of sequential shifts on the I/Q plane.

A demodulator according to the invention is very resistant to phase jitter (problem (A)), for the rather slow phase change constituting the problem has not very much time to influence during one monitoring interval (two sampling intervals). This is typical of differential demodulation methods, if the interval subject to monitoring is not very long.

A novel feature of the invention is that the demodulator according to the invention is very resistant to offsets of I and Q channels (offsets of d.c. level) as well as to low frequency and even rather high frequency interference voltages in a baseband signal. The intensity of phase jitter as well as of baseband interference is reduced by about 20 dB/decade, the frequency of the interference signal being below $1/(2*K*T)$, where T is the sampling period.

The baseband amplifiers may thus be simple a.c. coupled amplifiers, the low limit frequency of which is relatively high. The demodulator is also very resistant to the microphonism of the mixers and the AM detection of interferences, if only these effects are limited to frequencies being about 1.5 to 2 decades lower than the sampling frequency. And so is the case normally.

Figure 2:
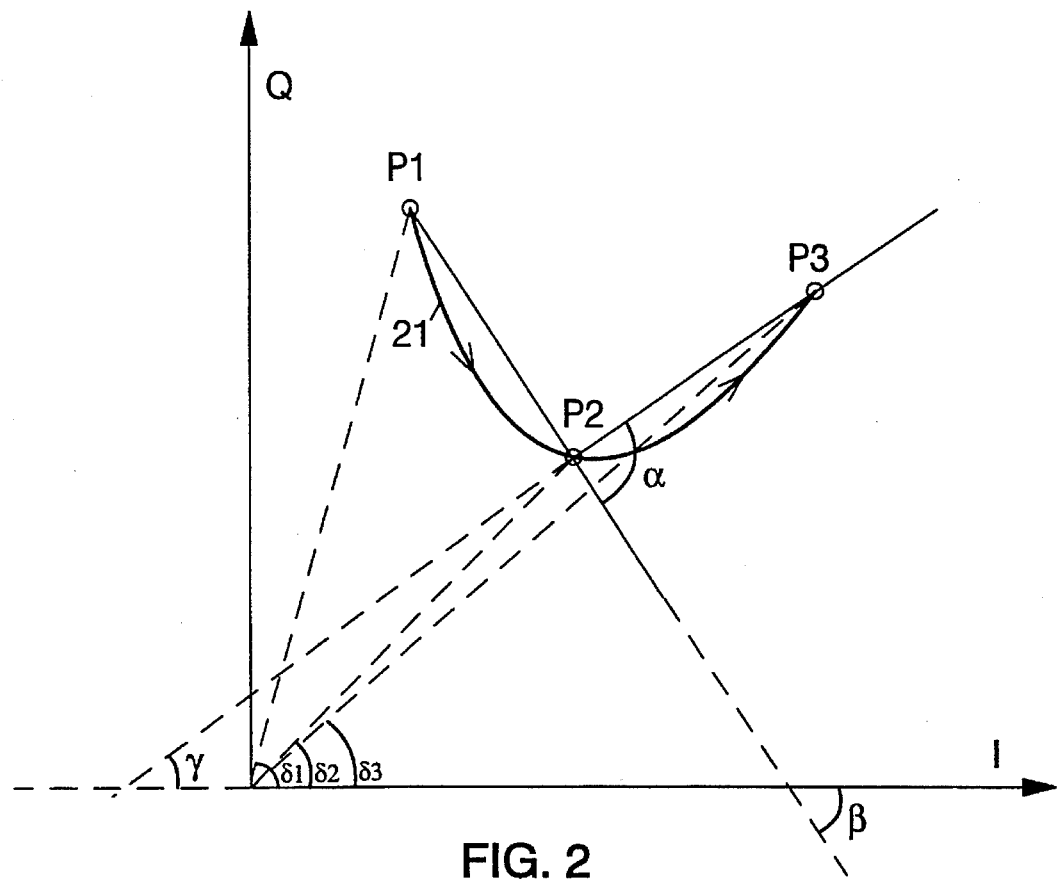
Figure 3:
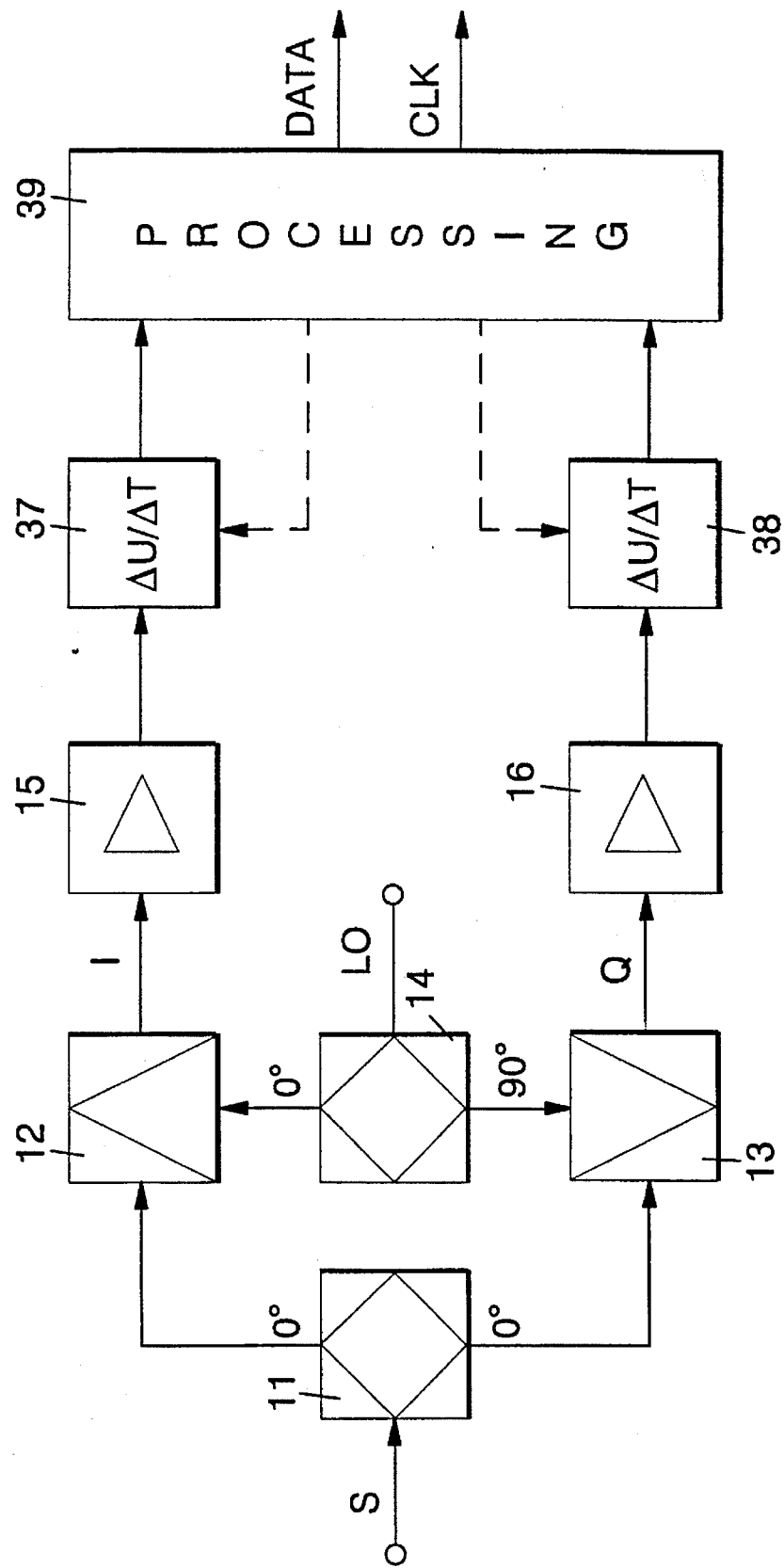
Figure 4:
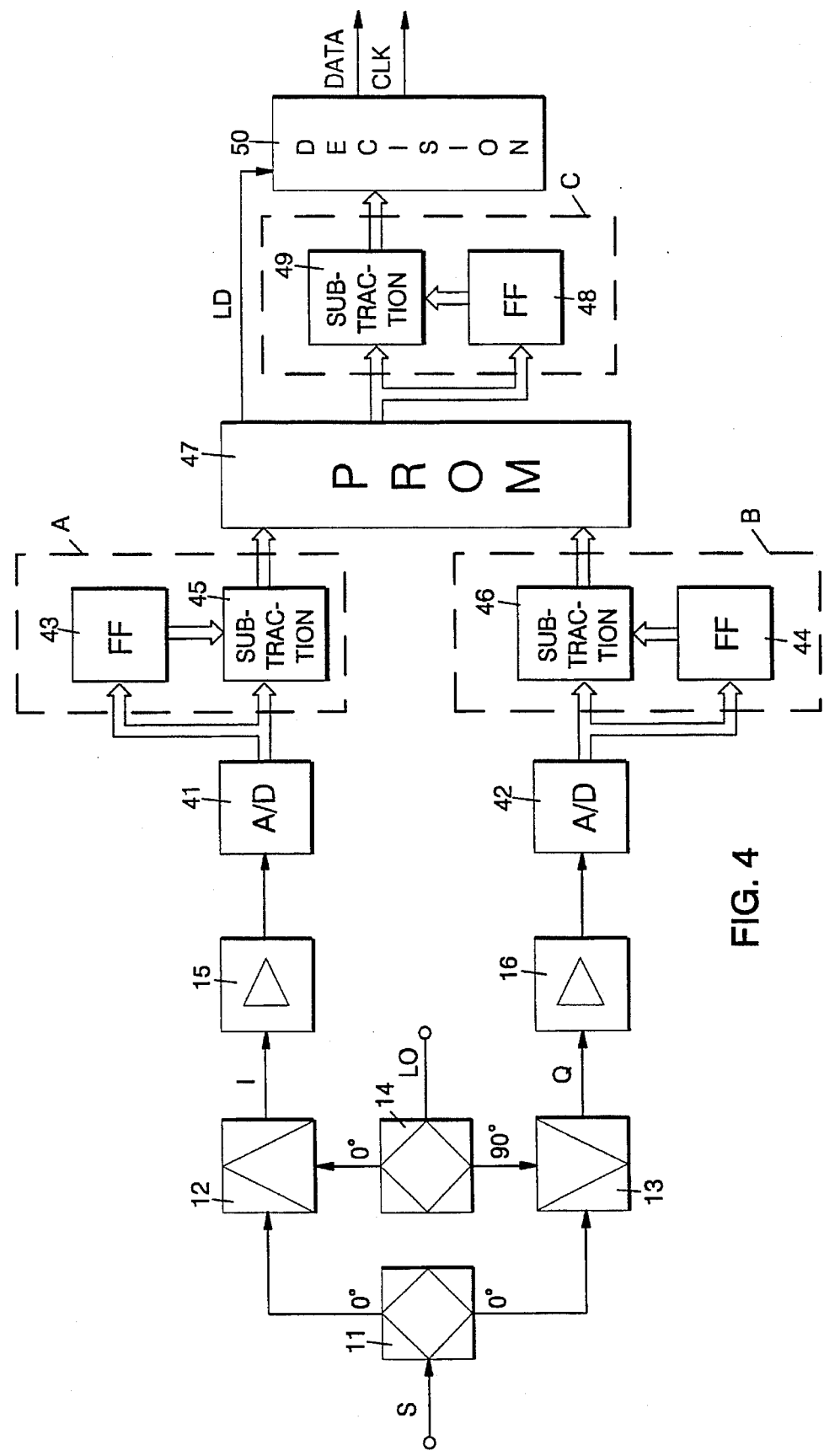
Figure 5:
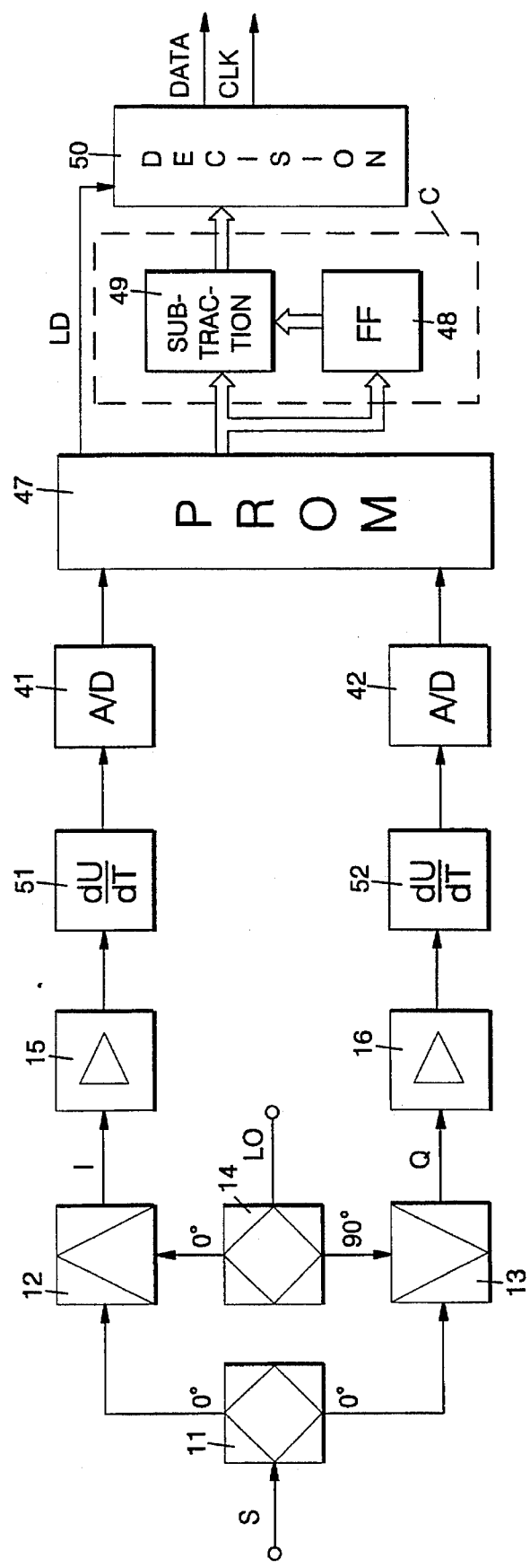

In the following, the invention will be described in more detail with reference to the examples of FIGS. 2 to 5 in the attached drawings, in which FIG. 1 shows a receiver using a typical quadrature detection, FIG. 2 illustrates the principle of the invention, FIG. 3 shows a block diagram of a detector according to the invention, FIG. 4 illustrates one implementation of the detector according to the invention in greater detail, and FIG. 5 illustrates an implementation alternative to the implementation shown in FIG. 4.

FIG. 2 illustrates the principle of demodulation according to the invention by showing constellation points (signal points) P1 to P3 corresponding to three sequential sampling moments on an I/Q plane. Reference numeral 21 indicates a curve representing a shift of a constellation point. In known methods, angles $\delta 1$ to $\delta 3$ of the constellation points are measured at reception with respect to origin and the received bits are decided on the basis of the absolute values of the angles, by using possibly also signal amplitude data (coherent detection), or on the basis of the differences between these angles (differential detection). According to the invention, the intention is not to measure said angles, but to measure the angle between the directions of sequential shifts occurring on the I/Q plane, i.e. differences between the directional angles of the sequential shifts. Such an angle is indicated in the figure by reference mark $\alpha$. A directional angle $\beta$ corresponds to a shift from point P1 to point P2 and a directional angle $\gamma$ corresponds to a shift from point P2 to point P3. The angle $\alpha$ between the directions of said shifts corresponds to the difference between the directional angles of the shifts, i.e. $\alpha=\gamma-\beta$ (angle $\beta$ is negative).

In practice, the shifts can be determined as a difference between the locations (P1, P2, P3) of the signal point at the sampling instances, for example. A second method is to derive at first I and Q signals and to measure the values of the derivative substantially in the middle of a shift. However, this second manner is worse, because it only produces an approximate value of the desired result.

A block diagram of a demodulator according to the invention is shown in-principle in FIG. 3. The reference numerals used are identical with those used for the identical parts in FIG. 1. The structure of the front end of the demodulator corresponds to the known structure shown in FIG. 1 as far as to the baseband amplifiers, and therefore, it is not described in this connection once more.

Essential for the invention are $\Delta U/\Delta T$ blocks 37 and 38, which are connected after a baseband amplifier in each reception branch. In these blocks, from the signals of the I and Q channels is calculated either a shift after sampling (change of signal value in the direction of each axis between two sequential sampling moments) or the derivative before sampling. The broken line in the figure designates a clock signal of the sampling. In some embodiments, the blocks 37 and 38 may have even combinated structures and they may also be implemented in alternative ways, as will be described below.

After the calculation of the signal shifts, the directional angles of the shifts and the difference between them are calculated in a processing unit 39. For this purpose, accurate methods and approximation methods are at disposal, which are not described in this connection, however, because they do not belong to the actual inventive idea. The essential thing is that usable calculation methods are easy to find for the calculation of directional angles. The value of a received symbol is decided from the angle $\alpha$ between the directions of the shifts (from the difference between the directional angles). In the processing unit, it is also possible to determine the lengths of the shifts occurred on the I/Q plane, and additionally, the length of the shift can be taken into consideration at decision-making, as will be described later on.

The details of the demodulator implementation method utilizing the method of the invention depends on the modulation to be used.

If e.g. 2-FSK (Frequency Shift Keying) modulation is concerned and the modulation index is e.g. h=1, the sampling frequency is typically two times the bit frequency (to make it possible to find out the rotation direction of a signal vector). If the angle $\alpha$ is positive, a higher frequency for instance has been transmitted, i.e. a logic one in this example, and if the angle $\alpha$ is negative, a lower frequency has been transmitted, i.e. a logic zero in this example.

If MSK modulation or 2-FSK modulation, where the modulation index is h=0,5, is concerned, the sampling frequency is typically equal to the bit frequency. Because a change in the signal phase between two sequential sampling moments may be only ±90 degrees in the case of MSK modulation, the decision-making limits are as follows when the method of the invention is used. If the angle $\alpha$ is between 0 and 135 degrees, a higher frequency (e.g. a logical one) has been received. On the other hand, if the angle $\alpha$ is between 0 and −135, a lower frequency (e.g. a logical zero) has been received. If the angle a is between ±135 and 180 degrees, a frequency (bit) different from the preceding one has been received.

By varying the sampling frequency and the decision-making limits, suitable demodulators are provided for different modulations, also on several levels, and for different modulation indices. However, the examples above are advantageous in the respect that they make it possible to implement the device (modulator and demodulator) in a relatively simple manner.

FIG. 4 illustrates one possible embodiment of the demodulator in more detail. Reference numerals used are still the same as those used for the identical parts in FIG. 1. After the baseband amplifiers 15 and 16 (which may include low-pass filtering and equalizers possibly needed), samples are taken from a signal and converted into a numerical form by means of A/D converters 41 and 42. Then the signal of each branch is applied to a dedicated subtraction unit A (branch I) and B (branch Q), respectively. In each branch, the subtraction unit comprises a memory means 43 and 44, respectively, as well as a subtraction circuit 45 and 46, respectively. The output of the A/D converter is connected both to the memory means and the subtraction circuit and the output of the memory means is connected to the subtraction circuit. Each memory means works as a register keeping the value produced by the A/D converter at the previous sampling moment in the memory. The subtraction circuit calculates the size of a shift in the direction of the corresponding axis (I or Q) by means of digital subtraction. An information of the size of the shift is supplied from the subtraction circuits to a memory circuit 47, e.g. a PROM circuit, in which is stored a programmable conversion table between I/Q coordinates and polar coordinates. By utilizing this table, a conversion from the I/Q coordinates to the polar coordinates is performed in the memory circuit, which means a conversion from the calculated shifts into an angular form. The size information is not necessary, if the length of the shifts in said modulation method is constant. If the length of the shifts is not constant (e.g. 4-FSK), the length information may be used together with the change in directional angle for decision-making.

As to each shift, an information of the size of its directional angle and possibly also of its length on the I/Q plane is obtained from the outputs of the memory circuit. The length data LD is supplied directly to a decision-making circuit 50 to be utilized for decision-making.

Instead of using a ready-prepared table, the conversion may also be calculated by means of combination logic or by software, if the shifts to be monitored occur slowly enough.

The values of the directional angles are supplied to a subtraction unit C next to the memory circuit, the implementation of which unit corresponds to that of the subtraction units A and B, this unit comprising a memory means 48 for storing the preceding value of the directional angle and a subtraction circuit 49 calculating the difference (angle α) between the sequential directional angles by means of digital subtraction.

After this, it is easy to make a decision on the received bit in the decision-making circuit 50 on the basis of the above criteria. As stated before, e.g. the decision-making criteria will vary according to which modulation method is used.

A physical implementation as described above is simple and in large extent digital, due to which an equipment operating reliably in various conditions is achieved.

FIG. 5 illustrates an embodiment alternative to the embodiment shown in FIG. 4. This alternative embodiment corresponds to the above-mentioned manner of deriving at first the I and Q signals and measuring the values of the derivative substantially in the middle of the shift. For this purpose, derivative circuits 51 and 52, respectively, deriving analog I and Q signals with respect to time have been connected after the baseband amplifiers. A derived signal is converted into a numerical form (into discrete samples) in A/D converters 41 and 42, respectively, and supplied to the memory circuit 47 operating as described above. In principle, the only difference between the embodiments according to the FIGS. 4 and 5 is the order of implementation, i.e. at which stage a change-over from the processing of a continuous signal to the processing of a discrete signal occurs.

Though the invention has above been described with reference to the examples according to the attached drawings, it is clear that the invention is not restricted thereto, but it can be modified within the scope of the inventive idea set forth above and in the attached claims. As stated above already, the details of the implementation of the demodulator vary according to which modulation method is used each time. As also appears from the above, the principle of the invention is suitable for all such modulation methods in which a zero shift is not possible between two sequential sampling moments (directional angle cannot be found out from zero shift).

I claim:

1. A method for demodulating a digitally modulated signal, according to which method a signal (S) to be received is mixed essentially to quadrature related I and Q baseband signals, characterized in that from the baseband signals are measured differences ($\alpha$) between directional angles ($\beta$, $\gamma$) of sequential shifts of a signal point on I/Q plane and said difference is utilized for decision-making concerning a received symbol.

2. A method according to claim 1, characterized in that the received symbol is decided only on the basis of said difference ($\alpha$).

3. A method according to claim 1, characterized in that the received symbol is decided on the basis of said difference ($\alpha$) and the length of said shift.

4. A method according to claim 1, characterized in that, when measuring the directional angle ($\beta$, $\gamma$), the sizes of the shifts occurred in the direction of both I and Q axis are determined as a difference between the locations (P1, P2, P3) of the signal point at the sampling moments.

5. A method according to claim 1, characterized in that, when measuring the directional angle ($\beta$, $\gamma$), the sizes of the shifts occurred in the direction of both I and Q axis are determined by means of the derivative by deriving (51; 52) at first the I and Q signals and by measuring after that (41; 42) the values of the derivative substantially in the middle of the shift.

6. A demodulator for demodulating a digitally modulated signal, which demodulator comprises mixing means (12, 13, 14) for mixing a signal (S) to be received into I and Q signals, which are essentially in quadrature with each other, characterized in that it comprises means (37, 38, 39) for measuring differences (a) between directional angles (B, y) of sequential signal point shifts occurred on I/Q plane.

7. A demodulator according to claim 6, characterized in that said means comprise calculating means (A; B) for calculating the size of a shift occurred between two sequential sampling moments both in the direction of I axis and in the direction of Q axis.

8. A demodulator according to claim 7, characterized in that said calculating means comprise both for the I and the Q signal a subtraction unit (A; B) comprising a memory means (43; 46) and a subtraction means (45; 46) for calculating the size of a shift occurred in the direction of said axis.

9. A demodulator according to claim 6, characterized in that said means comprise deriving means (51; 52) for determining the derivative of the I signal as well as of the Q signal.

10. A demodulator according to claim 7, characterized in that said means additionally comprise a memory circuit, preferably a PROM circuit (47), for the determination of at least the directional angles ($\beta$, $\gamma$) as response to the information given by said calculating means.

11. A demodulator according to claim 10, characterized in that said means additionally comprise a third subtraction unit (C) comprising a memory means (48) and a subtraction means (49), which unit is responsive to the memory circuit (47) for the determination of the differences ($\alpha$) between the directional angles on the basis of the information of the directional angles given by the memory circuit.

12. A demodulator according to claim 10, characterized in that said means additionally comprise length determination means (47) for determining the length of a shift occurred on I/Q plane.

13. A demodulator according to claim 12, characterized in that the length determination means are included in said memory circuit (47).

* * * * *